Patented Aug. 28, 1928.

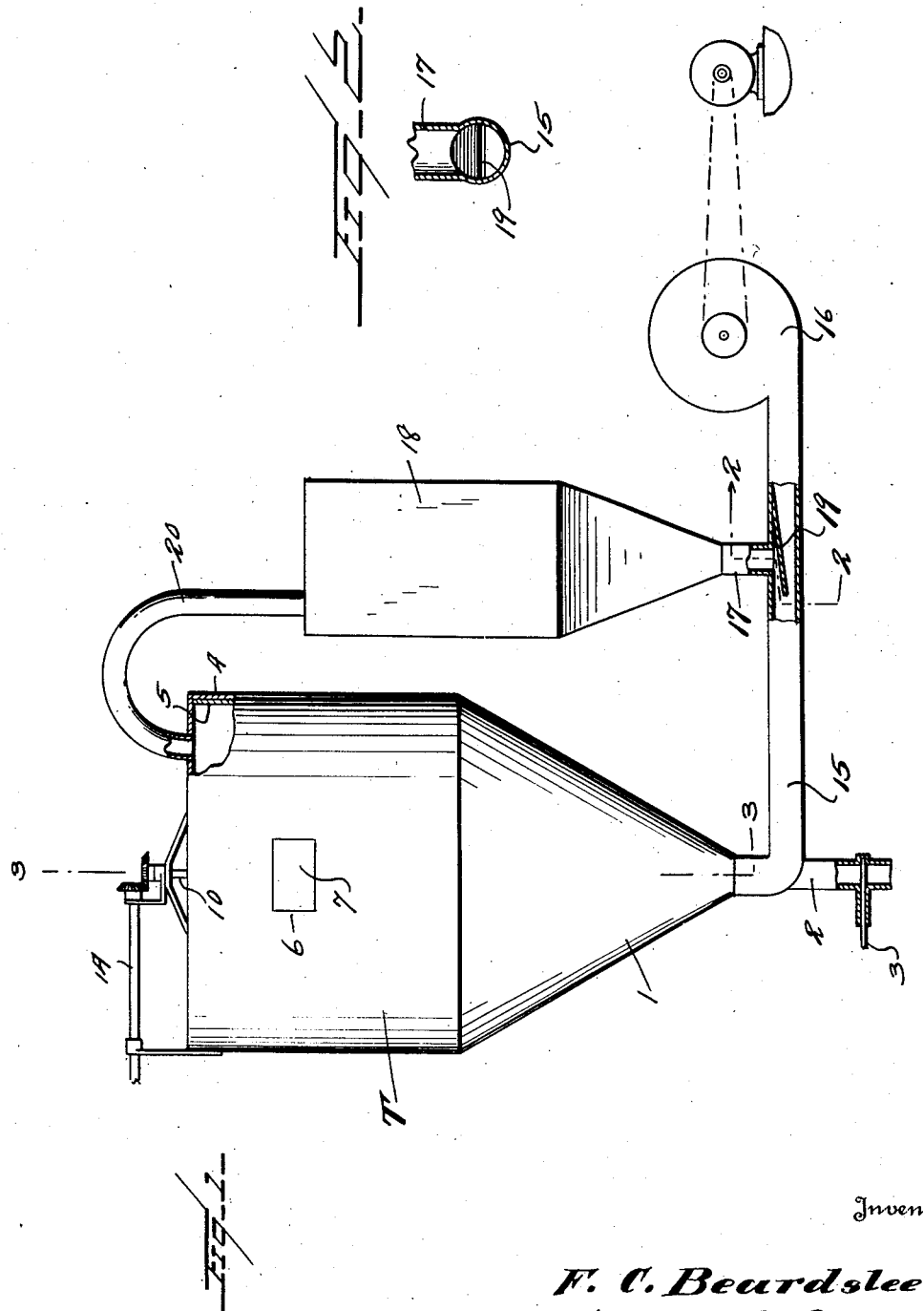

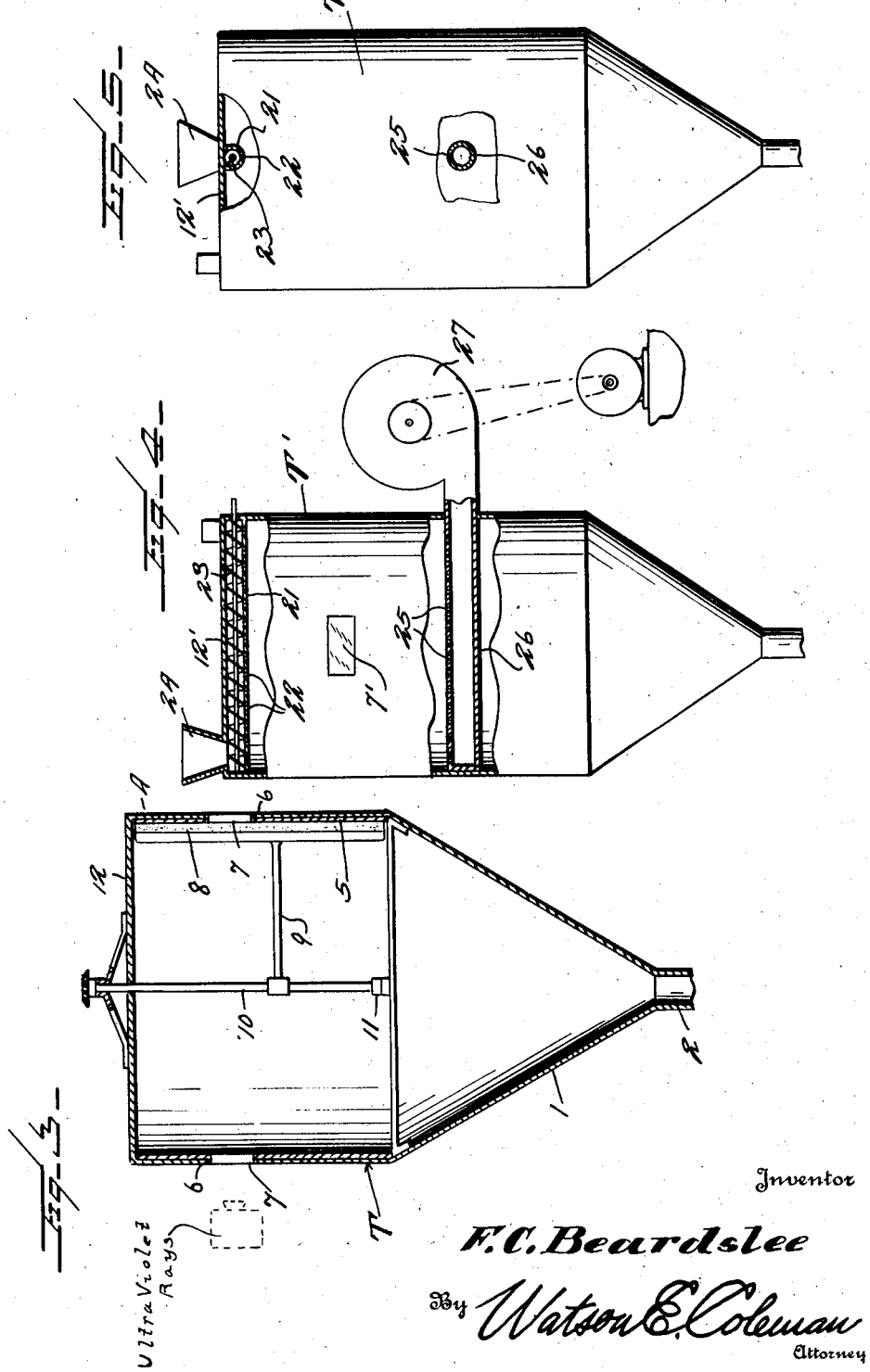

1,682,318

UNITED STATES PATENT OFFICE.

FRANCIS C. BEARDSLEE, OF LOS ANGELES, CALIFORNIA, ASSIGNOR TO SAID BEARDS-
LEE, B. M. HUFFINE AND J. I. HUFFINE, JOINT TRUSTEES, OF LOS ANGELES, CALI-
FORNIA.

TREATMENT OF FOOD MATERIALS.

Original application filed October 14, 1926, Serial No. 141,618. Divided and this application filed December 15, 1927. Serial No. 240,296.

This invention relates to a treatment of food materials and the primary object of the invention is the irradiation of food materials with ultra violet rays for the purpose of creating or increasing the vitamins or food factors that are closely associated with the ultra violet rays.

It is also an object of the invention to treat food materials in a manner whereby such vitamins or food factors are created or increased to render the consumer anti-rachitic.

Another object of the invention is to provide for the irradiation of food materials with ultra violet rays in a manner whereby the materials during the period subjected to such rays are in such condition to best respond to the action or influence of the rays.

A still further object of the invention is to subject food materials to irradiation by ultra violet rays and wherein the materials during such period of treatment are agitated to increase the efficiency of such irradiation.

Furthermore, it is an object of the invention to subject food materials while in motion to irradiation by ultra violet rays whereby requisite treatment of the food materials is accomplished to the best advantage.

The invention also has for an object to treat food materials in a manner whereby such vitamins or food factors are created or increased to render such materials anti-sterilic and thereby increasing the fertility of the consumer.

A still further object of the invention is to treat food material for poultry in a manner whereby the viability of the embryo is increased.

The invention also has for an object to provide a treatment of food materials wherein such materials are pneumatically maintained in agitation within the irradiation of ultra violet rays, thus assuring effective action of the rays upon all sides of the material.

The novel features of my invention will hereinafter be definitely claimed.

In order that my invention may be the better understood, I will now proceed to describe the same with reference to the accompanying drawings, wherein:—

Figure 1 is a view in elevation and of a diagrammatic character with portions broken away of an apparatus for use in the treatment of food materials constructed in accordance with an embodiment of my invention;

Figure 2 is a detailed sectional view taken substantially on the line 2—2 of Figure 1;

Figure 3 is a sectional view taken substantially on the line 3—3 of Figure 1 with parts omitted;

Figure 4 is an elevational view with portions broken away illustrating an apparatus constructed in accordance with a further embodiment of my invention;

Figure 5 is a view in elevation with portions broken away of the structure illustrated in Figure 4 turned substantially 90°.

As disclosed in Figures 1 to 3 inclusive, T denotes an irradiating tank of desired capacity and cylindrical in form with its lower portion 1 conoidal and with its apex continued by a discharge spout 2. The flow through this spout 2 is under control of a valve 3 of any preferred type.

The peripheral wall 4 of the cylindrical portion of the tank T is provided with a lining 5, the outer surface of which constituting a reflecting surface whereby the light rays directed within the tank T are polarized. This lining 5 is preferably metallic with the outer reflecting surface highly polished.

The peripheral wall of the tank T, preferably at diametrically opposed points, is provided with the windows 6 closed by the transparent panels 7 of quartz glass. It is to be understood, however, that the panels 7 may be of any material permitting passage therethrough of ultra violet rays without absorption.

The inner surfaces of the panels 7 are preferably flush with the reflecting surface of the lining 5 so that the wiper 8 will operate to effectively maintain the reflecting surface of the lining 5 and the inner surfaces of the panels 7 free of dust deposit whereby such reflecting surface and the panels 7 may be maintained at a high degree of efficiency.

As herein disclosed, the wiper 8 is vertically disposed and extends substantially entirely along the upper cylindrical portion of the tank T. This wiper is arranged at the outer end portion of an arm 9 carried by a shaft 10. The shaft 10 is disposed axially of the cylindrical portion of the tank T with its lower portion engaged within a suitable bearing 11 and its upper portion extending above the glass top 12 of the tank T. This upper extended portion of the shaft 10 is in driven connection with a shaft 14 operated in any desired manner. It is also to be understood that the shaft 10 may be driven in a manner other than herein illustrated.

The upper portion of the spout 2 has in communication therewith the conduit 15 leading from a blast fan 16 or other source of air under pressure. In communication from above with the conduit 15, as indicated at 17 in Figure 1, is a hopper or bin 18 in which is initially deposited the food materials to be treated. The conduit 15 directly below the communication between said conduit 15 and the hopper or bin 18 has interposed therein a septum or partition 19 extending on a downward and forward incline in the direction of travel of the air blast and upon which the food material is directly received as the same is discharged from the hopper or bin 18. The suction of the air blast carries with it the material upon this septum or partition 19 and discharges the same upwardly within the tank T and maintains such food material within the tank in suspension. Ultra violet rays are projected within the tank T through the panels 7 whereby the food material in suspension or agitation, as it may be stated, within the tank is subjected to irradiation by such rays upon all sides and thereby assuring effective treatment of the food material by such rays.

In communication with the tank T through the top 12 thereof is a return pipe or conduit 20 leading to the hopper or bin 18. This return pipe or conduit 20 also serves as a vent to permit escape of air within the tank T. This pipe or conduit 20 is returned to the bin or hopper 18 in order to assure recovery of such food materials as may be carried off by the escaping air.

By subjecting the food material to the action of ultra violet rays the vitamins or food factors are created or increased and particularly those vitamins or food factors which will render the food anti-rachitic or anti-sterilic. The food material subjected to irradiation by ultra violet rays may be for human consumption or by poultry, stock or other animals. When used in connection with poultry feed, the material treated in accordance with my invention is anti-rachitic and anti-sterilic. This treated food material also increases the viability of the embryo.

In the embodiment of my invention as illustrated in Figures 4 and 5, the top 12' of the tank T' is provided radially thereacross with a trough 21, the low point of which being provided with a series of longitudinally spaced openings 22. Working within this trough 21 is an auger 23 running the entire length of the trough, or more particularly extending substantially entirely across the upper portion of the tank T'. This auger 23 serves to carry the food materials delivered through the hopper 24 along the trough for discharge through the openings 22 into the tank T' against the action of the air jets emitted through the openings 25 in the air pipe 26 extending within the tank T' directly below the trough 21 and in parallelism therewith. This pipe 26 leads from a blast fan 27 or other source of air under pressure.

As the food material drops into the tank T' through the openings 22 the air jets will serve to maintain such food material in suspension or agitation, thus assuring effective action of the ultra violet rays upon such material. These rays are received within the tank T' through one or more windows 7'.

In herein referring to ultra violet rays it is to be understood that this embraces the rays or beams emitted by any lamp producing the ultra violet ray.

It will be readily understood from the foregoing that in either of the two embodiments of my invention as herein disclosed, the food material will be caused to pass through the beam or beams of ultra violet rays entering within the tank through either or both of the windows.

This application is a division of my application Serial No. 141,618, filed October 14, 1926.

I claim:—

1. Means for treating food materials to irradiation by ultra violet rays comprising a tank, pneumatic means for maintaining the material within the tank to be treated in suspension, a wall of the tank having a window to permit entry into the tank of the ultra violet rays, said tank being provided with an outlet for the pressure therein, and means for recovering the material carried out by such pressure.

2. An apparatus of the class described comprising a tank having a window in a wall thereof for admisison within the tank of ultra violet rays, a supply tank for the material to be treated, a second tank discharging within the first tank, pneumatic means for maintaining in suspension the material within the first named tank, and a pipe line connecting both of the tanks, said pipe line providing an outlet for the pressure in the first tank and for returning to the second tank such material as may be carried off through the pipe line.

3. Means for treating food materials to irradiation by ultra violet rays comprising a tank, pneumatic means for maintaining the material when the tank to be treated in suspension, a wall of the tank having a window to permit entry into the tank of the ultra violet rays, said tank being provided with an outlet for the pressure therein, means for recovering the material carried out by such pressure, and a discharge spout leading from the bottom of the tank.

4. An apparatus for subjecting food material to irradiation by ultra violet rays comprising a tank to receive the material to be treated, a bin, a conduit leading from the upper portion of the tank and discharging within the bin, a conduit affording communication between the lower portion of the bin and the tank, means for forcing an air blast through the second conduit into the tank to draw the material within the bin into the tank and to maintain in suspension material in the tank, and a window in a wall of the tank to permit discharge therethrough of ultra violet rays to within the tank.

5. An apparatus for subjecting food material to irradiation by ultra violet rays comprising a tank to receive the material to be treated, a bin, a conduit leading from the upper portion of the tank and discharging within the bin, a conduit affording communication between the lower portion of the bin and the tank, means for forcing an air blast through the second conduit into the tank to draw the material within the bin into the tank and to maintain in suspension material in the tank, a window in a wall of the tank to permit discharge therethrough of ultra violet rays to within the tank, and a partition within the second conduit upon which the bin directly discharges.

6. An apparatus for subjecting food material to irradiation by ultra violet rays comprising a tank to receive the material to be treated, a bin, a conduit leading from the upper portion of the tank and discharging within the bin, a conduit affording communication between the lower portion of the bin and the tank, means for forcing an air blast through the second conduit into the tank to draw the material within the bin into the tank and to maintain in suspension material in the tank, a window in a wall of the tank to permit discharge therethrough of ultra violet rays to within the tank, and a partition within the second conduit upon which the bin directly discharges, said partition extending on a downward and forward incline in the direction of travel of the air blast.

In testimony whereof I hereunto affix my signature.

FRANCIS C. BEARDSLEE.